(Model.)
A. J. JOHNSON.
MACHINE FOR PUNCHING METAL.
No. 253,608. Patented Feb. 14, 1882.
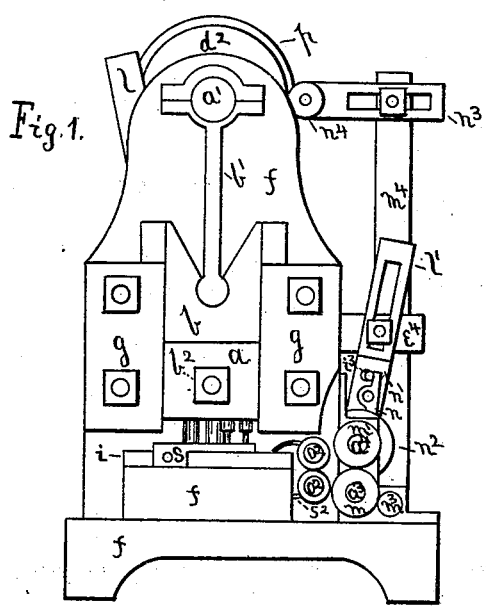
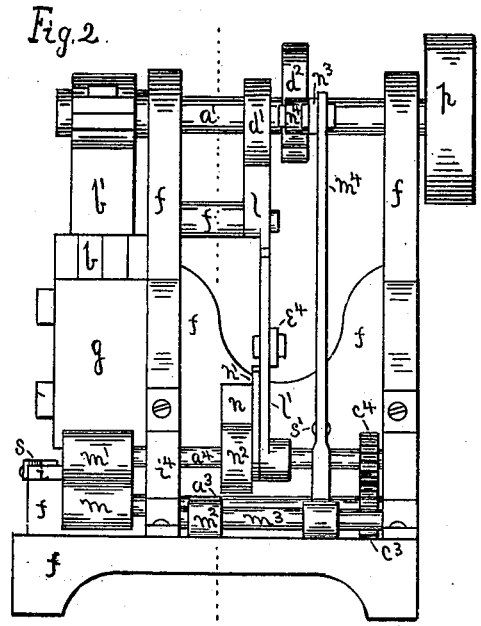
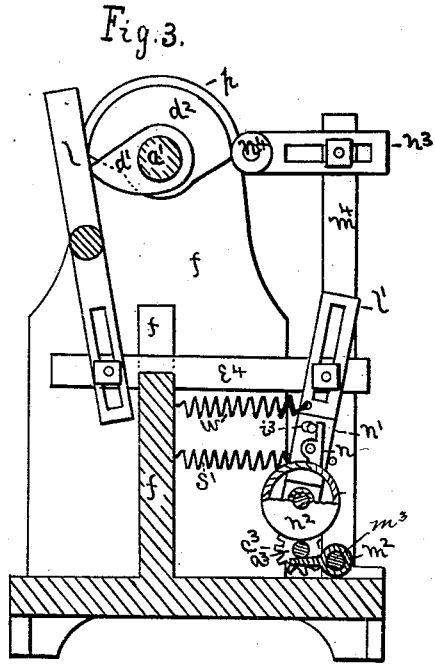
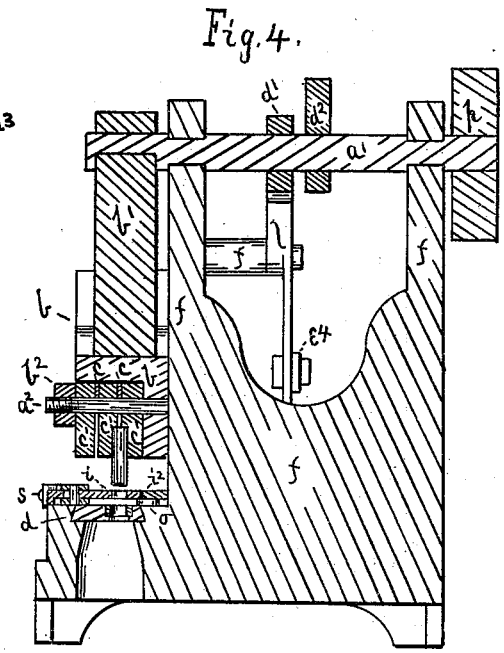
Witnesses
John H. Oakley
George F. Robinson
Inventor
Andrew J. Johnson
by Bradford Howland
Atty.

(Model.) 2 Sheets—Sheet 2.
A. J. JOHNSON.
MACHINE FOR PUNCHING METAL.
No. 253,608. Patented Feb. 14, 1882.
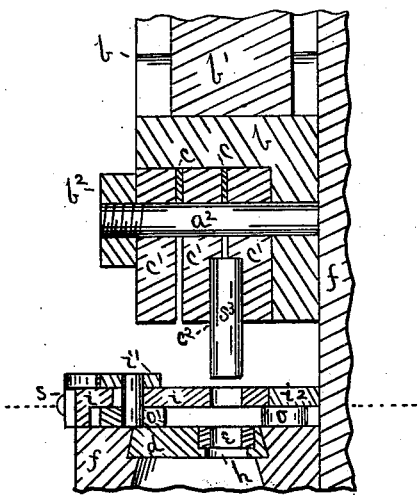
Fig. 5.
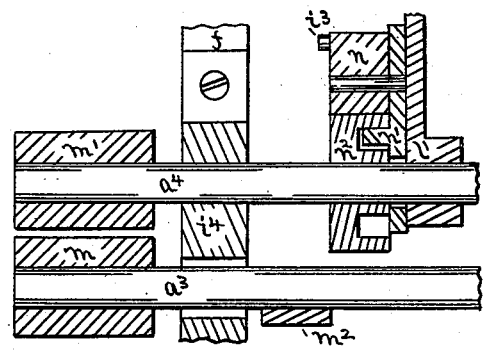
Fig. 6.
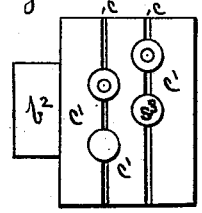
Fig. 7.
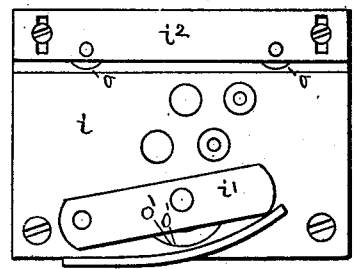
Fig. 8.
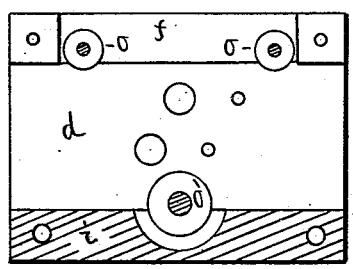
Fig. 9.
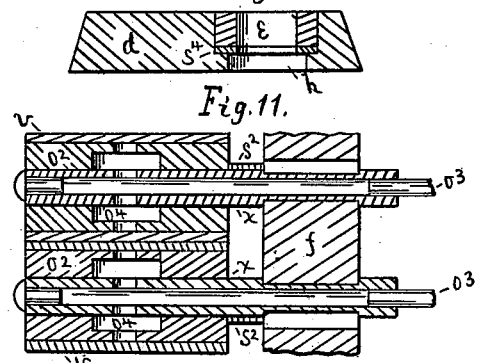
Fig. 10.
Fig. 11.
Witnesses
John H. Oakley
George F. Robinson
Inventor
Andrew J. Johnson
by Bradford Howland
atty.

UNITED STATES PATENT OFFICE.

ANDREW J. JOHNSON, OF CUYAHOGA FALLS, OHIO, ASSIGNOR TO ERSKINE L. BABCOCK, OF SAME PLACE.

MACHINE FOR PUNCHING METAL.

SPECIFICATION forming part of Letters Patent No. 253,608, dated February 14, 1882.

Application filed August 19, 1880. (Model.)

*To all whom it may concern:*

Be it known that I, ANDREW J. JOHNSON, of Cuyahoga Falls, Summit county, Ohio, have invented a new and useful Machine for Punching Metal, of which the following is a specification.

My invention relates to improvements in machines for punching or cutting metals, in which the material to be operated on is automatically fed to the punching-tools.

The objects of my improvements are, first, to intermittingly release the material from pressure between the feed-rolls for the purpose of allowing it to be properly adjusted in relation to the punches; second, to retain the punches firmly in their holder by compression of the plates composing the holder in which the punch-sockets are formed; third, to provide the die-plate with dies which are adjustable to compensate for wear and sharpening; fourth, the adjustment of the material to be punched by means of a spring; and, fifth, to facilitate the oiling of the material by means of hollow rolls perforated for the transmission of the oil.

Figure 1 is a front elevation. Fig. 2 is a side elevation. Fig. 3 is a vertical cross-section at the dotted line shown in Fig. 2. Fig. 4 is a longitudinal vertical section. The remaining figures are on an enlarged scale. Fig. 5 represents a longitudinal section of the die-holder and punch-holder. Fig. 6 shows a longitudinal section of the feed-rolls and parts for operating them. Fig. 7 is a view of the bottom of the punch-holder. Fig. 8 is a plan of the die-holder and stripper. Fig. 9 is a horizontal section at the dotted line in Fig. 5. Fig. 10 is a section, on an enlarged scale, of the die-plate. Fig. 11 is a sectional view of the oil-rolls and adjacent parts.

The slide $b$ carries the punch-holder $a$, and is given a vertical reciprocating motion by means of a pitman, $b'$, shaft $a'$, and pulley $p$. It moves in guides $g$, which are bolted to frame $f$. The punch-holder $a$ is constructed of plates $c'$ by placing them together with thin metallic sheets $c$ between them, in which position they are firmly held, and the punches $s^3$, in their sockets $c^2$, compressed with plates $c'$ by means of nut $b^2$ on screw-bolt $a^2$. Screw-bolt $a^2$ is fastened in slide $b$ and extends through punch-holder $a$. The thin sheets $c$ extend down to the screw-bolt. When the punch-holder is thus constructed several punches or tools may be firmly held in close proximity to each other, which would be impossible or difficult to do by the use of set-screws in the customary manner of holding tools.

The die-plate $d$ is supported in frame $f$, and is removable therefrom. Die $e$ is in the form of a bush, or a thin piece of steel in the desired shape, firmly inserted in and supported by die-plate $d$. The socket $h$ in die-plate $d$, below the die, is slightly larger than the opening of the die to allow the die to be forced up in its socket for the purpose of grinding or sharpening it. When the die has been shortened by use it may be removed and a ring, $s^4$, placed in its socket for the die to rest on when replaced. The stripper $i$ is bolted to the frame, leaving space between it and the frame for the material which is to be punched, and also for the guide-roll $o'$. Arm $i'$ is pivoted to the stripper and supports guide-roll $o'$. The adjustable bar $i^2$ supports the two guide-rolls $o$ $o$. The strip of metal to be punched is pressed by guide-roll $o'$, actuated by spring $s$, against guide-rolls $o$ $o$. Spring $s$ is attached to stripper $i$ and presses against the pivoted arm $i'$, which supports guide-roll $o'$. The guide-rolls $o$ $o$ $o'$ adjust the strip of metal to be punched to its proper position, when it is released from pressure between feed-rolls $m$ $m'$, as will be hereinafter shown.

The shafts $a^3$ $a^4$ of feed-rolls $m$ $m'$ are connected by gear-wheels $c^3$ $c^4$, and are operated to feed the machine by means of cam $d'$ on shaft $a'$, connected by lever $l$, cross-bar $e^4$, arm $l'$, spring $w'$, and jaws $n$ $n'$ with wheel $n^2$ on shaft $a^4$. Lever $l$ is pivoted to frame $f$. Cross-bar $e^4$ is adjustable on lever $l$ and arm $l'$ for the purpose of regulating the feed. The jaw $n'$ is loose on pin $i^3$ and shaft $a^4$ to allow of slight vertical movement of the jaw in griping the flange of wheel $n^2$, and also to allow lateral movement of pin $i^3$ with arm $l'$ to turn jaw $n$ on its pivot. Jaws $n$ $n'$ are pivoted together, and pin $i^3$ is fastened in arm $l'$. By turning arm $l'$ to the right, Figs. 3 and 6, pin $i^3$, which extends through a hole in jaw $n'$, somewhat larger than the pin, turns jaw $n$ on its pivot, causing its lower end to press on the circumference of wheel $n^2$, and thereby lift jaw $n'$ until the flange of the wheel is griped between the jaws which turn wheel $n^2$, shafts $a^4 a^3$, their gear-wheels $c^3 c^4$, and feed-rolls $m m'$ to feed the machine. After the strip of metal to be punched has been thus fed forward, spring $w'$, which is attached to frame $f$ and arm $l'$, moves back the arm, and thereby releases wheel $n^2$ from the bite of jaws $n n'$, and causes the upper arm of lever $l$, Fig. 3, to follow the form of cam $d'$ and approach shaft $a'$.

The shaft $a^3$ of the lower feed-roll, $m$, turns in box $i^4$, which is elongated to allow feed-roll $m$ to be lowered to release the strip to be punched from pressure between the feed-rolls. When so released the strip is subject to lateral adjustment by the pressure of guide-roll $o'$, actuated by spring $s$, Fig. 5. When rolls $m m'$ are feeding the strip to the punch, feed-roll $m$ is pressed against the strip by a short arm, $m^2$, Fig. 6, on rock-shaft $m^3$, Figs. 2 and 3, which is operated by arm $m^4$, connected by bar $n^3$ and roller $n^4$ with cam $d^2$ on shaft $a'$. The arm $n^3$, Fig. 3, is adjustable on arm $m^4$, to regulate the relative position of feed-roll $m$ to roll $m'$ for strips of different thickness to be punched.

In the relative positions of the various parts, as shown in the drawings, the punch $s^3$, Fig. 5, is about to descend, the cam $d'$, Fig. 3, has ceased to force out the upper arm of lever $l$, and hence the rolls $m m'$ have already fed forward the strip to be punched. While the punch is descending, and before it strikes the strip, cam $d^2$ permits roller $n^4$, actuated by spring $s'$, to approach shaft $a'$, and thereby lowers arm $m^2$ and releases the strip from pressure between feed-rolls $m m'$, and enables guide-roll $o'$ to adjust the strip, if needed, by forcing it against guide-rolls $o o$ before the punch strikes the strip; also, while the punch is descending, cam $d'$ permits spring $w'$ to move arm $l'$ to the left, thereby releasing the jaws $n n'$ and sliding them on the flange of wheel $n^2$. When the strip has been punched and the punch has been withdrawn from it and is continuing to ascend, cam $d^2$ forces out arm $m^4$ and again compresses the strip between feed-rolls $m m'$, and cam $d'$ forces out the upper arm of lever $l$, and thus causes rolls $m m'$ to feed forward the strip to be punched.

The strip is oiled by passing between oil-rolls $o^2 o^2$, Figs. 1 and 11, which are compressed against it by spring $s^2$, and turn on hollow shafts $x x$. The boxes of these shafts are elongated to allow the oil-rolls vertical adjustment to different thicknesses of strips passing between them. Oil is conducted by tubes $o^3 o^3$ (parts of which are shown in Fig. 11) into one end of each shaft $x$, the opposite end of the shaft being closed. The sides of shafts $x$ are perforated to allow oil to flow into cavities $o^4$, extending around the interior of oil-rolls $o^2$, and from thence to the circumference of the rolls, where it saturates a fibrous or other suitable covering, $v$, around the rolls.

This machine may be used for making nuts by placing in the punch-holder a tool for cutting off nuts from the punched strip.

I claim as my invention—

1. The feed-rolls $m m'$, one of them having an intermittent motion away from the other, in combination with shaft $a^3$, rock-shaft $m^3$, arms $m^2 m^4 n^3$, and cam $d^2$, substantially as described.

2. The jaws $n n'$, in combination with flanged wheel $n^2$ and arm $l'$, provided with pin $i^3$, substantially as described.

3. The cam $d'$ and lever $l$, in combination, and adjustably connected with arm $l'$, jaws $n n'$, wheel $n^2$, and feed-rolls $m m'$, substantially as described.

4. The punch-holder $a$, in combination with pitman $b'$, shaft $a'$, cams $d' d^2$, lever $l$, arms $l' m^4 m^2$, jaws $n n'$, adjusting guide-roll $o'$, and feed-rolls $m m'$, one of the feed-rolls having an intermittent motion away from the other, substantially as and for the purpose specified.

ANDREW J. JOHNSON.

Witnesses:
A. B. CURTISS,
JOHN R. BLAKESLEE.